US009881143B2

United States Patent
Vanderveen et al.

(10) Patent No.: US 9,881,143 B2
(45) Date of Patent: Jan. 30, 2018

(54) METHODS AND APPARATUS FOR PROVIDING PRIVATE EXPRESSION PROTECTION AGAINST IMPERSONATION RISKS

(71) Applicant: QUALCOMM Incorporated, San Diego, CA (US)

(72) Inventors: Michaela Vanderveen, Tracy, CA (US); Vincent D. Park, Budd Lake, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 13/706,849

(22) Filed: Dec. 6, 2012

(65) Prior Publication Data

US 2014/0165214 A1 Jun. 12, 2014

(51) Int. Cl.
*G06F 21/12* (2013.01)
*H04L 29/06* (2006.01)
(Continued)

(52) U.S. Cl.
CPC .............. *G06F 21/12* (2013.01); *G06F 21/33* (2013.01); *H04W 12/06* (2013.01); *H04L 63/12* (2013.01);
(Continued)

(58) Field of Classification Search
CPC ......... G06F 21/12; G06F 21/10; H04L 63/12; H04L 67/1068; H04L 67/104;
(Continued)

(56) References Cited

U.S. PATENT DOCUMENTS 7,076,255 B2 7/2006 Parupudi et al.
8,032,181 B2 10/2011 Hauck et al.
(Continued)

FOREIGN PATENT DOCUMENTS

GB 2470811 A * 12/2010 ............. H04L 29/08
GB 2470811 A 12/2010
(Continued)

OTHER PUBLICATIONS

Monteiro, D.M.; Rodrigues, J.J.P.C.; Lloret, J., "A secure NFC application for credit transfer among mobile phones,", May 14-16, 2012, 2012 International Conference on Computer, Information and Telecommunication Systems (CITS), pp. 1-5.*
(Continued)

*Primary Examiner* — Nelson Giddins
(74) *Attorney, Agent, or Firm* — Haojin Wang

(57) ABSTRACT

A method, an apparatus, and a computer program product for wireless communication are provided in connection with providing private expression protection in a wireless communications network. In one example, a UE is equipped to internally receive a request (e.g., from an application running on the UE) to announce a private expression and/or at least a reference to an expression-code associated with the private expression, and determine whether the reference to the expression-code and/or the expression-code matches a stored instance of the expression-code. In an aspect, the UE may be equipped to announce the at least one of the private expression or the expression-code when stored instance of the expression-code corresponds to the expression-code received with the request. In another aspect, the UE may be equipped to prohibit announcement of any information associated with the private expression when stored expression-code does not correspond to the expression-code received with the request.

44 Claims, 10 Drawing Sheets

(51) Int. Cl.
*H04L 12/10* (2006.01)
*H04L 12/12* (2006.01)
*H04W 76/02* (2009.01)
*H04L 29/08* (2006.01)
*H04W 12/06* (2009.01)
*G06F 21/33* (2013.01)
*H04W 12/10* (2009.01)
*H04W 12/12* (2009.01)

(52) U.S. Cl.
CPC ........ *H04L 63/1466* (2013.01); *H04L 67/104* (2013.01); *H04L 67/1068* (2013.01); *H04W 12/10* (2013.01); *H04W 12/12* (2013.01); *H04W 76/023* (2013.01)

(58) Field of Classification Search
CPC . H04L 67/1074; H04L 67/06; H04L 67/1078; H04L 29/08423; H04W 76/023; H04N 21/83; H04N 21/835; G06Q 20/3226; G06Q 20/327; G06Q 20/3278
USPC .......................................................... 726/30
See application file for complete search history.

(56) References Cited

U.S. PATENT DOCUMENTS

| | | | |
|---|---|---|---|
| 8,798,075 B2* | 8/2014 | Pantalone et al. | 370/395.52 |
| 9,059,980 B2 | 6/2015 | Kean et al. | |
| 2005/0268014 A1 | 12/2005 | Geib et al. | |
| 2006/0055963 A1* | 3/2006 | Otsuka et al. | 358/1.15 |
| 2008/0066181 A1* | 3/2008 | Haveson et al. | 726/26 |
| 2009/0111378 A1* | 4/2009 | Sheynman | H04W 8/005 |
| | | | 455/41.1 |
| 2009/0210702 A1 | 8/2009 | Welingkar et al. | |
| 2010/0043061 A1* | 2/2010 | Martin | G06Q 30/0603 |
| | | | 726/4 |
| 2010/0069067 A1 | 3/2010 | Vanderveen et al. | |
| 2011/0039592 A1 | 2/2011 | Haddad et al. | |
| 2012/0011572 A1* | 1/2012 | Chew | H04L 63/0853 |
| | | | 726/4 |
| 2012/0015629 A1* | 1/2012 | Olsen et al. | 455/411 |
| 2012/0064828 A1* | 3/2012 | Khan | H04L 63/0492 |
| | | | 455/41.1 |
| 2012/0110646 A1* | 5/2012 | Ajitomi et al. | 726/4 |
| 2012/0300938 A1* | 11/2012 | Kean | H04L 9/3234 |
| | | | 380/279 |
| 2013/0067350 A1* | 3/2013 | Kataoka et al. | 715/748 |
| 2013/0091353 A1 | 4/2013 | Zhang et al. | |
| 2014/0122563 A1* | 5/2014 | Singh | H04L 67/34 |
| | | | 709/203 |
| 2015/0012743 A1* | 1/2015 | Holtmanns | H04W 12/04 |
| | | | 713/155 |

FOREIGN PATENT DOCUMENTS

| | | |
|---|---|---|
| WO | WO-2008030759 A1 | 3/2008 |
| WO | WO-2012087762 A1 | 6/2012 |

OTHER PUBLICATIONS

Becher, M.; Freiling, F.C.; Hoffmann, J.; Holz, T.; Uellenbeck, S.; Wolf, C., "Mobile Security Catching Up? Revealing the Nuts and Bolts of the Security of Mobile Devices," May 22-25, 2011, 2011 IEEE Symposium on Security and Privacy, pp. 96-111.*
International Search Report and Written Opinion—PCT/US2013/073522—ISA/EPO—Apr. 2, 2014.

* cited by examiner

METHODS AND APPARATUS FOR PROVIDING PRIVATE EXPRESSION PROTECTION AGAINST IMPERSONATION RISKS

BACKGROUND

Field

The present disclosure relates generally to communication systems, and more particularly, to a use of private expressions with device to device (D2D) communications in a wireless communications based network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

Currently, many devices (e.g., user equipments (UEs)) may be operable in a cellular network. D2D LTE protocols may provide for communications between UEs that are in direct communication range. UEs may use expressions to announce various attributes (user or service identities, application features, location, etc.) as driven by proximity-aware applications. Expressions may be public—when they are accessible to any UEs within range of the announcing UE, or private—when access is limited to only certain UE that have been authorized in advance. When using private expressions, an announcing UE may have provided (e.g., via an offline process) a corresponding expression-code to the one or more monitoring UEs that have been granted permission to access/decode the announced expression when in proximity.

However, user security breaches may arise from private expression impersonation risks. For example, where a first user knows an expression-code associated with a second user, the first user can impersonate the second user by using an application to generate a request that the first user's device announces a private expression with the second user's expression-code. Thus others may be tricked into thinking that the second user is present.

As the demand for D2D communication increases, there exists a need for methods/apparatuses for protecting private expression identifiers in wireless communications based networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing private expression protection in a LTE based WWAN. In one example, a UE is equipped to internally receive a request (e.g., from an application running on the UE) to announce a private expression and/or at least a reference to an expression-code associated with the private expression, and determine whether the reference to the expression-code and/or the expression-code matches a stored instance of the expression-code. In an aspect, the UE may be equipped to announce the at least one of the private expression or the expression-code when stored instance of the expression-code corresponds to the expression-code received with the request. In another aspect, the UE may be equipped to prohibit announcement of any information associated with the private expression when stored expression-code does not correspond to the expression-code received with the request.

According to related aspects, a method for providing private expression protection is a wireless communications network is provided. The method can include receiving at least a reference to a request to announce a private expression. In an aspect, the request may include an expression-code associated with the private expression. Further, the method can include determining, by an expression verification manager (EVM), whether the at least a reference to the expression-code corresponds to a previously obtained and stored instance of the expression-code. In an aspect, the method may include announcing at least one of the private expression or the expression-code upon a determination that the expression-code corresponds to the stored instance of the expression-code. Additionally or in the alternative, in an aspect, the method may include prohibiting announcement of information associated with the private expression upon a determination that the expression-code does not correspond to the stored instance of the expression-code.

Another aspect relates to a communications apparatus configured to provide private expression protection in a LTE based wireless communications network. The communications apparatus can include means for receiving a request to announce at least a reference to a private expression. In an aspect, the request may include an expression-code associated with the private expression. Further, the communications apparatus can include means for determining, by an expression verification manager (EVM), whether the at least a reference to the expression-code corresponds to a previously obtained and stored instance of the expression-code. In an aspect, the communications apparatus can include means for announcing at least one of the private expression or the expression-code upon a determination that the expression-code corresponds to the stored instance of the expression-code. Additionally or in the alternative, in an aspect, the communications apparatus can include means for prohibiting announcement of information associated with the private expression upon a determination that the expression-code does not correspond to the stored instance of the expression-code.

Another aspect relates to a communications apparatus. The apparatus can include a processing system configured to receive a request to announce a private expression. In an aspect, the request may include at least a reference to an expression-code associated with the private expression. Further, the processing system may be configured to determine, by an expression verification manager (EVM), whether the at least a reference to the expression-code corresponds to a previously obtained and stored instance of the expression-code. In an aspect, the processing system may further be configured to announce at least one of the private expression or the expression-code upon a determination that the expression-code corresponds to the stored instance of the expression-code. Additionally or in the alternative, in an aspect, the processing system may further be configured to prohibit announcement of information associated with the private expression upon a determination that the expression-code does not correspond to the stored instance of the expression-code.

Still another aspect relates to a computer program product, which can have a computer-readable medium including code for receiving a request to announce a private expression. In an aspect, the request may include at least a reference to an expression-code associated with the private expression. Further, the computer-readable medium can include code for determining, by an expression verification manager (EVM), whether the at least a reference to the expression-code corresponds to a previously obtained and stored instance of the expression-code. In an aspect, the computer-readable medium can include code for announcing at least one of the private expression or the expression-code upon a determination that the expression-code corresponds to the stored instance of the expression-code. Additionally or in the alternative, in an aspect, the computer-readable medium can include code for prohibiting announcement of information associated with the private expression upon a determination that the expression-code does not correspond to the stored instance of the expression-code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
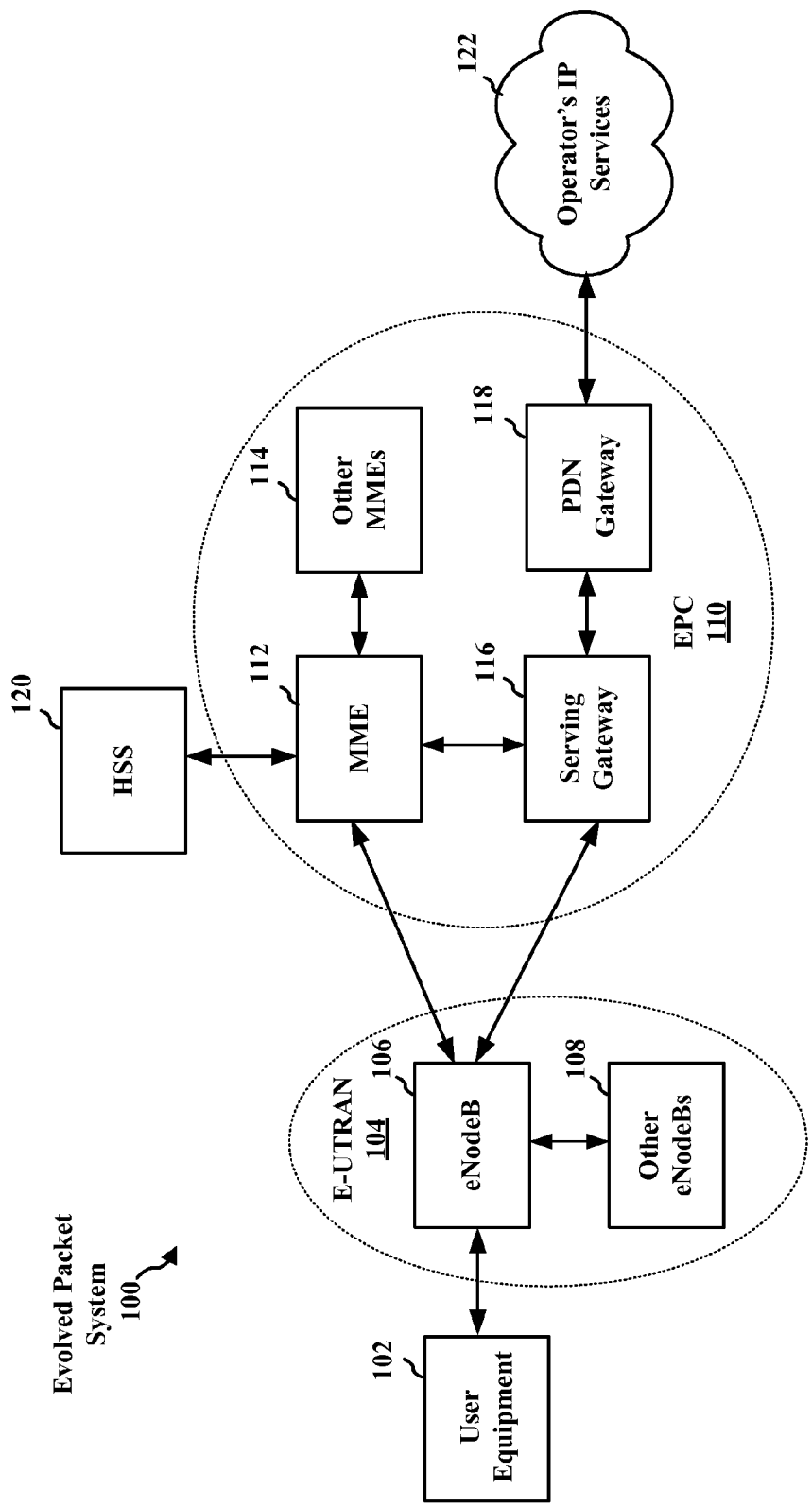
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
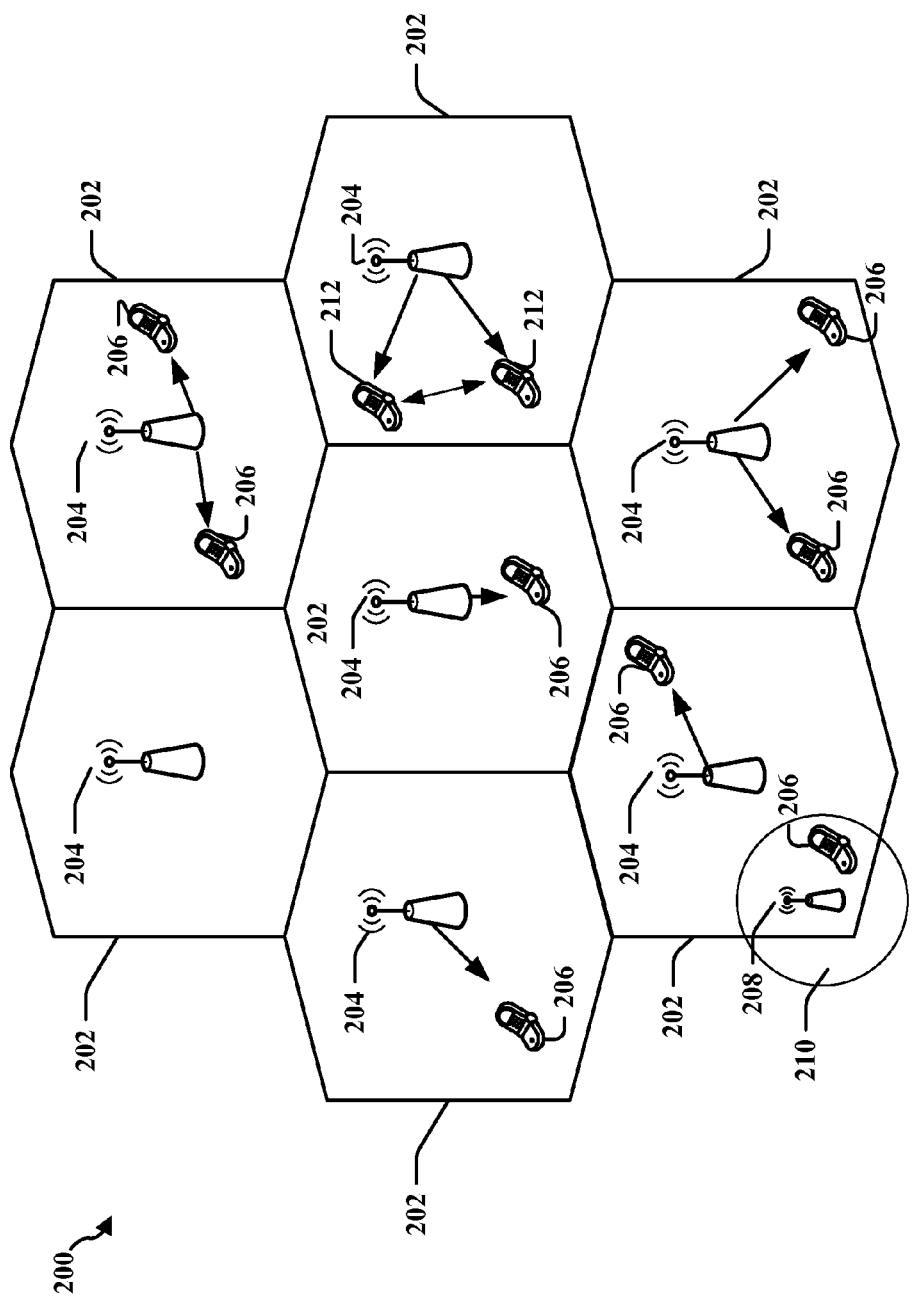
FIG. 2 is a diagram illustrating an example of an access network.

FIG. 2 is a diagram illustrating an example of an access network 200 in a LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
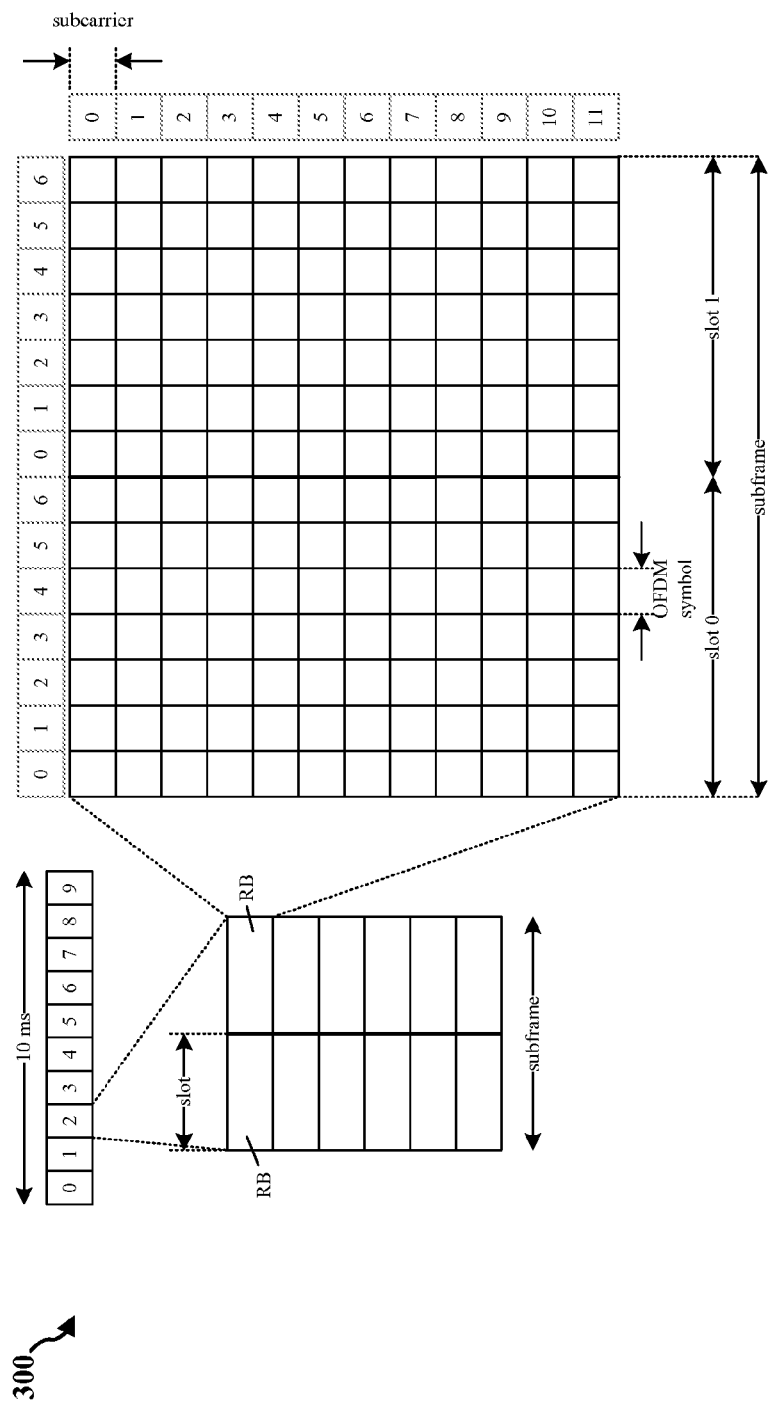
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
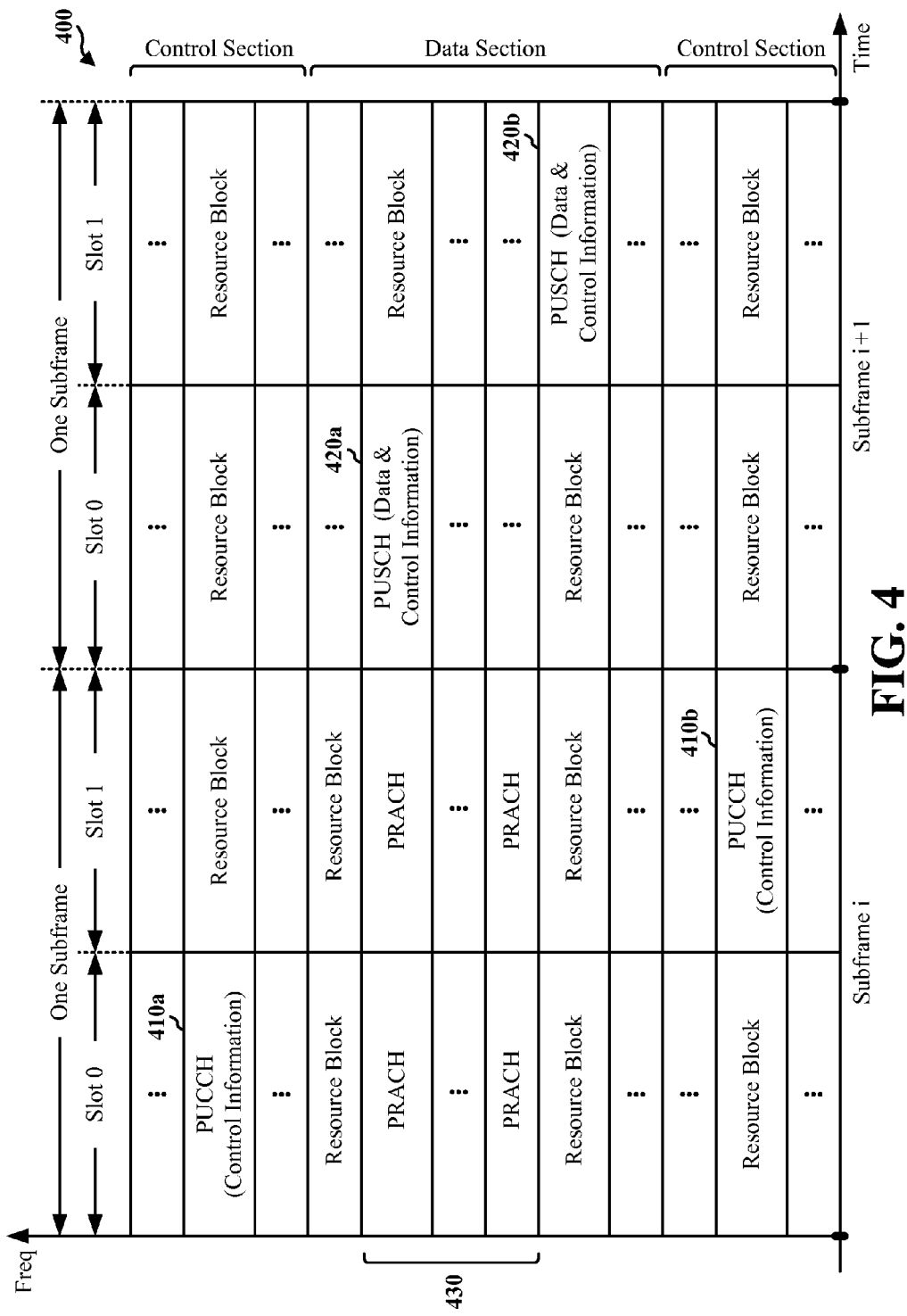
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
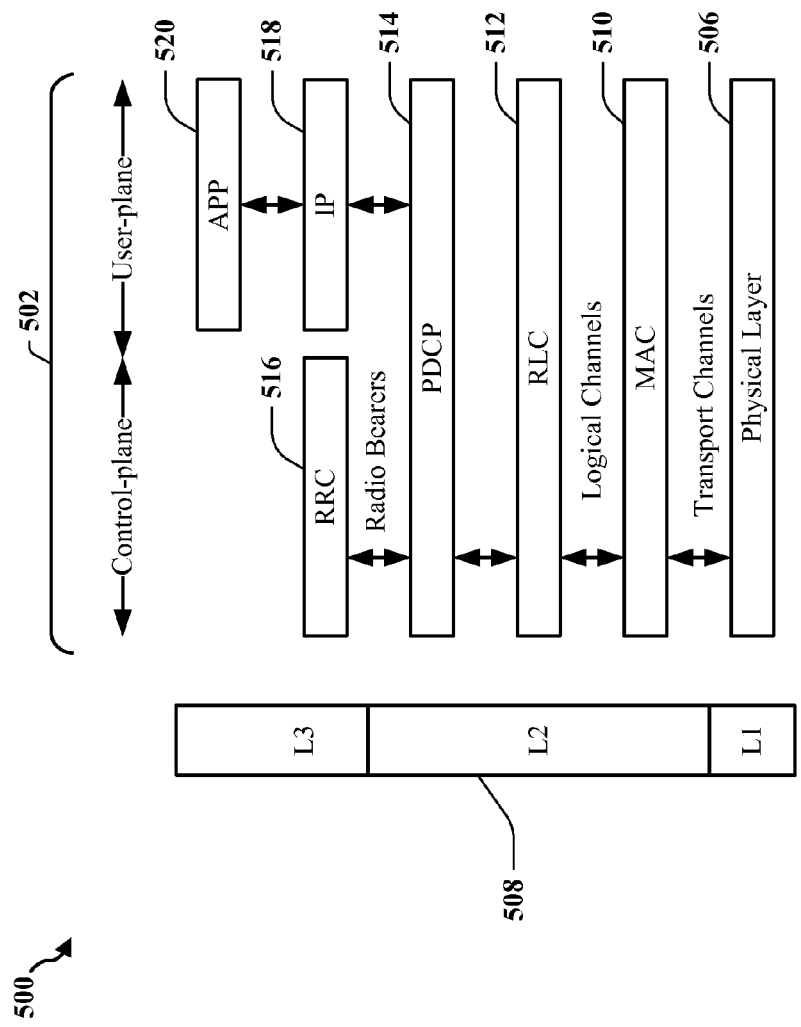
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the eNB is shown with three layers: Layer 1, Layer 2, and Layer 3. Communication 522 of data/signaling may occur between UE 502 and eNB 504 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE 502. The user plane also includes an internet protocol (IP) sublayer 518 and an application sublayer 520. The IP sublayer 518 and application sublayer 520 are responsible for supporting communication of application data between the eNB 504 and the UE 502.

Figure 6:
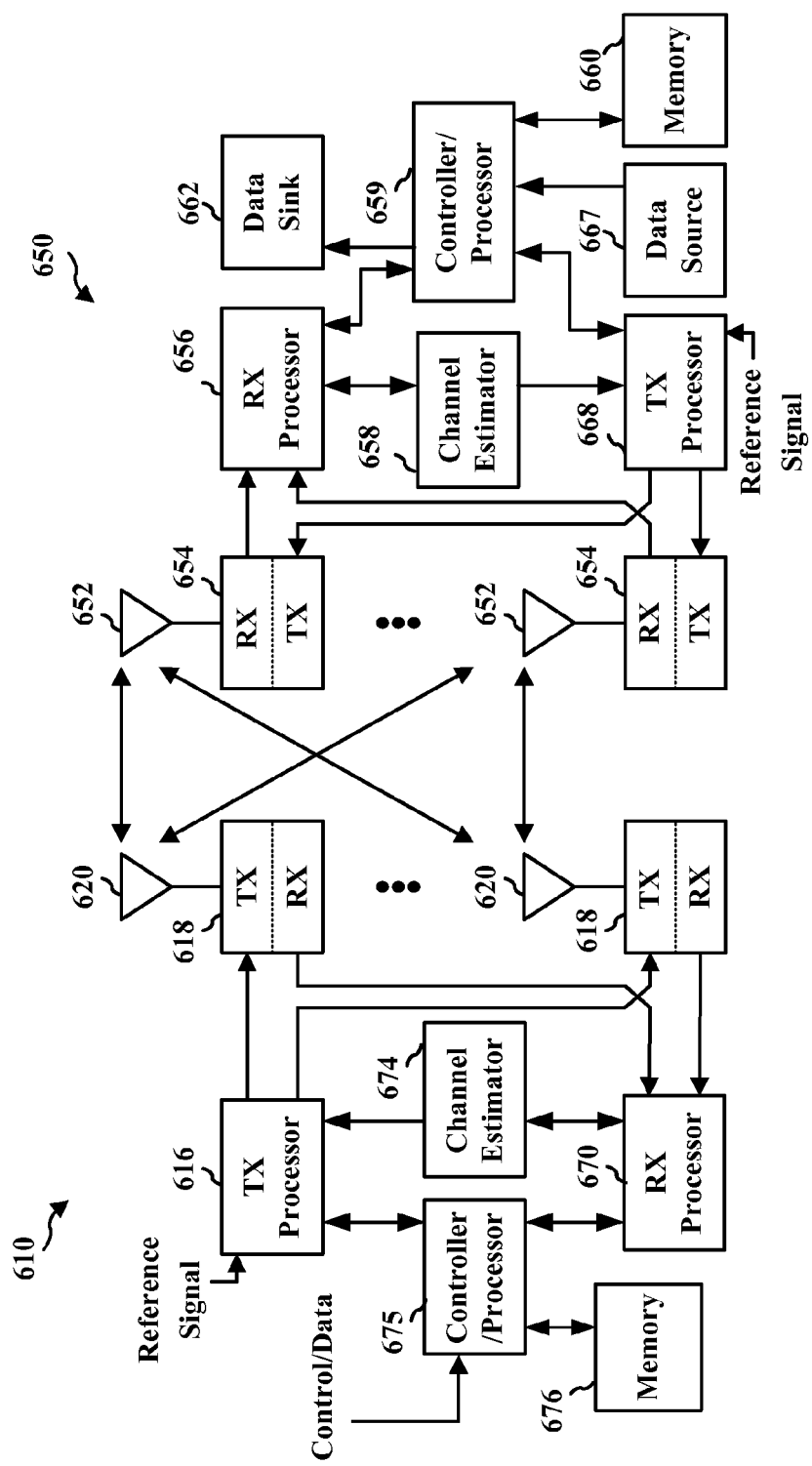
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
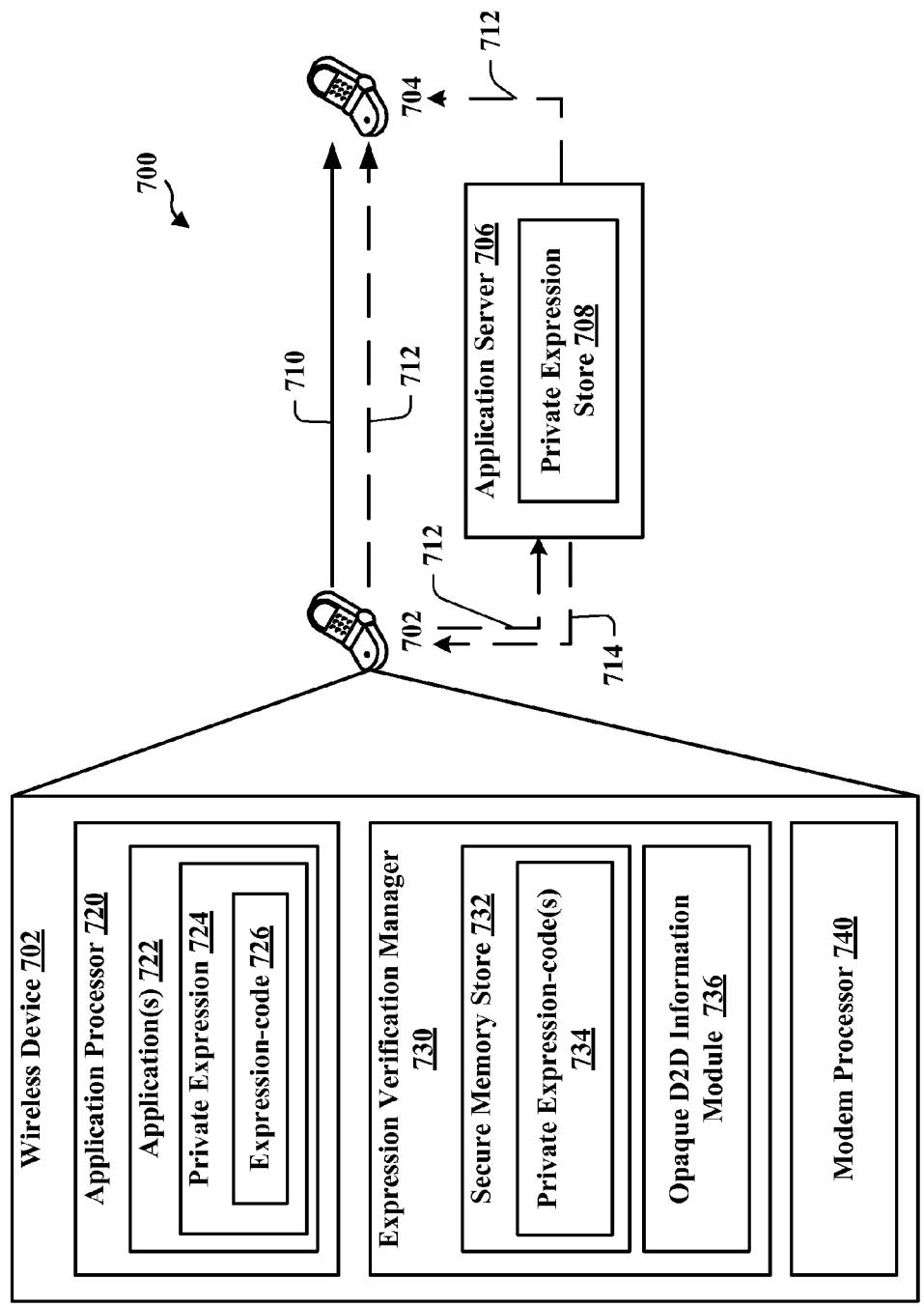
FIG. 7 is a diagram illustrating a device-to-device communications network.

FIG. 7 is a diagram of a device-to-device communications system 700. The device-to-device communications system 700 includes a plurality of wireless devices 702, 704. In an optional aspect, device-to-device communications system 700 may also include application server 706 operable to communicate with one or more of the wireless devices 702, 704.

The device-to-device communications system 700 may overlap with a cellular communications system, such as for example, a wireless wide area network (WWAN). Some of the wireless devices 702, 704 may communicate together in device-to-device communication using the DL/UL WWAN spectrum and/or unlicensed spectrum (e.g., WiFi), some may communicate with a base station, and some may do both. In another aspect, the WWAN may include multiple base stations that may provide a coordinated communications environment through connectivity provided via one or more network entities (e.g., MMEs, etc.).

Wireless device 702 may include, among other components, an application processor 720, an expression verification manager 730, and a modem processor. In an aspect, application processor 720 may be configured to enable one or more applications 722. In such an aspect, an application 722 may include a private expression 724 for announcement to one or more other authorized peer devices (e.g., wireless device 704. As depicted in FIG. 7, each private expression may have an associated expression-code 726. The expression-code 726 may be intercepted and used by the receiving wireless device to assist in accessing the private expression 724. Further, the expression-code 726 may used to assist in private expression 724 self authentication (e.g., confirming that the requesting application 722 is associated with the device from which the expression-code was generated/stored).

Expression verification manager 730 may include a secure memory store 732 (e.g., secure non-volatile memory). In an aspect, expression verification manager 730 may generate private expression-codes as part of application 722 configuration/reconfiguration processes. For example, as part of installation of an application 722, expression verification manager 730 may generate the private expression-codes. In an example, expression verification manager 730 may generate updated private expression-codes when an application 722 is reconfigured to change access characteristics associated with the private expression (e.g., which peer devices 704 are allowed access to the private expression). In an aspect, expression verification manager 730 may generate multiple private expression-codes associated with each application 722. In another aspect, secure memory store 732 may securely store the generated private expression-codes. Although FIG. 7 depicts expression verification manager 730 as a separate module from application processor 720 and modem processor 740, the expression verification manager 730 may reside in the application processor 720, in the modem processor 740, or any combination thereof. Further, in an aspect, the expression verification manager 730 may act as an interface between the application processor 720 and the modem processor 740. In another aspect, a first portion of the expression verification manager 730 may be associated with a modem processor 740, and a second portion of the expression verification manager 730 may be configured as an intermediary layer between an application processor 720 and the modem processor 740. In another aspect, secure memory store 732 may store information (e.g., opaque D2D information 712) from other devices 704. In such an aspect, received information may have a time to live (TTL) value. In another aspect, the TTL value may be locally generated. Modem processor 740 may be configured to receive and transmit information using one or more radio access technologies (RATs).

Application server 706 may be configured to store information associated with private expression communication. In an aspect, application server 706 may adhere to user-selected relations when distributing private expression-codes 726 to applications 722 on wireless devices (e.g., 702, 704). In an aspect, a trusted application server 706 may generate an expression-code 714 to be stored in the secure memory store 732.

In an operational aspect, as part of an application 722 configuration/reconfiguration process, opaque D2D information module 736 may assist wireless device 702 in generating opaque D2D information 712. In an aspect, opaque D2D information 712 may be transmitted directly to an authorized wireless device 704. In another aspect, opaque D2D information 712 may be communicated to application server 706 for storage in a private expression store 708 and communication to one or more authorized wireless devices 704. In an aspect, the opaque D2D information 712 may include the private expression 724, the expression-code 726, a name of the application 722, a counter, a time of generation, a previously generated expression-code, an expiration date, a certificate of the announcing wireless device 702, etc. In another aspect, the opaque D2D information 712 may be signed with a digital signature indicating authenticity of the opaque D2D information 712. In such an aspect, the digital signature may include an operator signed key, a temporary device identifier, a TTL value, etc.

In another operational aspect, an application 722 associated with wireless device 702 may request that a private expression 724 be announced. In such an aspect, the application 722 may send the request with the private expression 724 and an associated expression-code 726 to expression verification manager 730. Expression verification manager 730 may be configured to compare the received expression-code 726 with the private expression-code 734 stored in secure memory store 732. If the expression-code 726 matches the stored private expression-code 734, then expression verification manager 730 allows modem processor 740 to announce 710 the private expression 724. By contrast, if the expression-code 726 does not match the stored private expression-code 734, then expression verification manager 730 prohibits modem processor 740 from announcing 710 the private expression 724.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
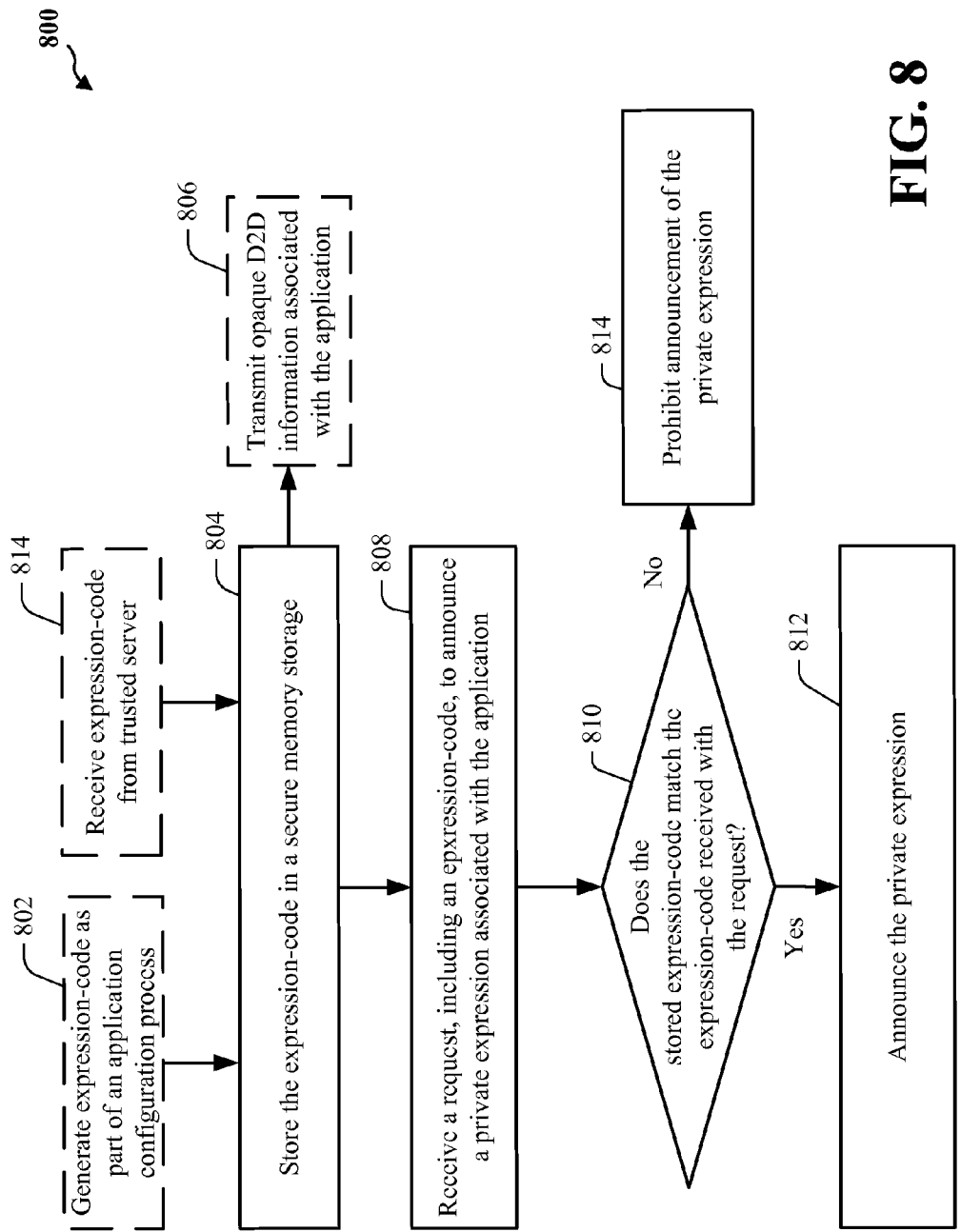
FIG. 8 is a flow chart of a method of wireless communication.

FIGS. 8 and 11 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 is a flow chart 800 of a second method of wireless communication. The method may be performed by a UE.

In an optional aspect, at block 802, the UE may generate an expression-code as part of a configuration process for an application and an associated private expression. In an aspect, the expression-code may be used for access control, e.g., to filter those who are allowed access to the corresponding private expression. For example, when a D2D-enabled application is first installed (and/or a de-friending occurs, e.g., revocation of private expression access authorization), the UE may generate both private expression and the expression-code associated with the private expression. In an aspect, the UE may regenerate the expression-code without generating the private expression when the expression-code is used over the air.

Additionally or in the alternative, in an optional aspect, at block 814, the UE may receive an expression-code securely from a trusted server.

In an aspect, at block 804, the UE may store the generated expression-code. In an aspect, the expression-code may be stored in a key store. In such an aspect, the key store may include a protected non-volatile physical memory for data and code. The key store may maintain local keys (e.g., codes) for announced private expressions. In another optional aspect, the key store maintains and optionally verifies remote keys for monitored private expressions. In such an aspect, verification of remote keys includes checking that the remote UE has authorized this UE to monitor for that expression, e.g. by employing signature verification.

In an optional aspect, the UE may also transmit opaque D2D information associated with the expression-code. In such an aspect, the opaque D2D information may be transmitted to another UE and/or a trusted application server. Further, in such an aspect, the opaque D2D information may include the private expression, the expression-code, a name of the application, a counter, a time of generation, a previously generated expression-code, an expiration date, a certificate of the announcing UE, etc. In another aspect, the opaque D2D information may be signed with a digital signature indicating authenticity of the opaque D2D information. In such an aspect, the digital signature may include an operator signed key, a temporary device identifier, a time to live (TTL) value, etc.

At block 808, the UE may receive a request from an application including the expression-code (and/or a reference to the expression-code) and requesting announcement of the associated private expression.

At block 810, the UE may determine whether the expression-code included with the announcement request matches the stored expression-code for the requesting application. In an aspect, an expression verification manager (EVM) associated with the UE may perform the determination. In such an aspect, the EVM may be a trusted entity that resides in the UE application processor (when it is part of an high level operating system (HLOS) "Service"), in the modem processor, or any combination thereof. Further, in an aspect, the EVM may act as an interface between the application and the UE's modem processor. In another aspect, a first portion of the EVM may be associated with a modem of the UE, and a second portion of the EVM may be configured as an intermediary layer between an application layer and a modem of the UE.

If at block 810, the UE determines that the expression-code included with the announcement request matches the stored expression-code for the requesting application, then at block 812, the UE may announce the private expression.

By contrast, if at block 810, the UE determines that the expression-code included with the announcement request does not match the stored expression-code for the requesting application, then at block 814, the UE may prohibit announcement of the private expression.

Figure 9:
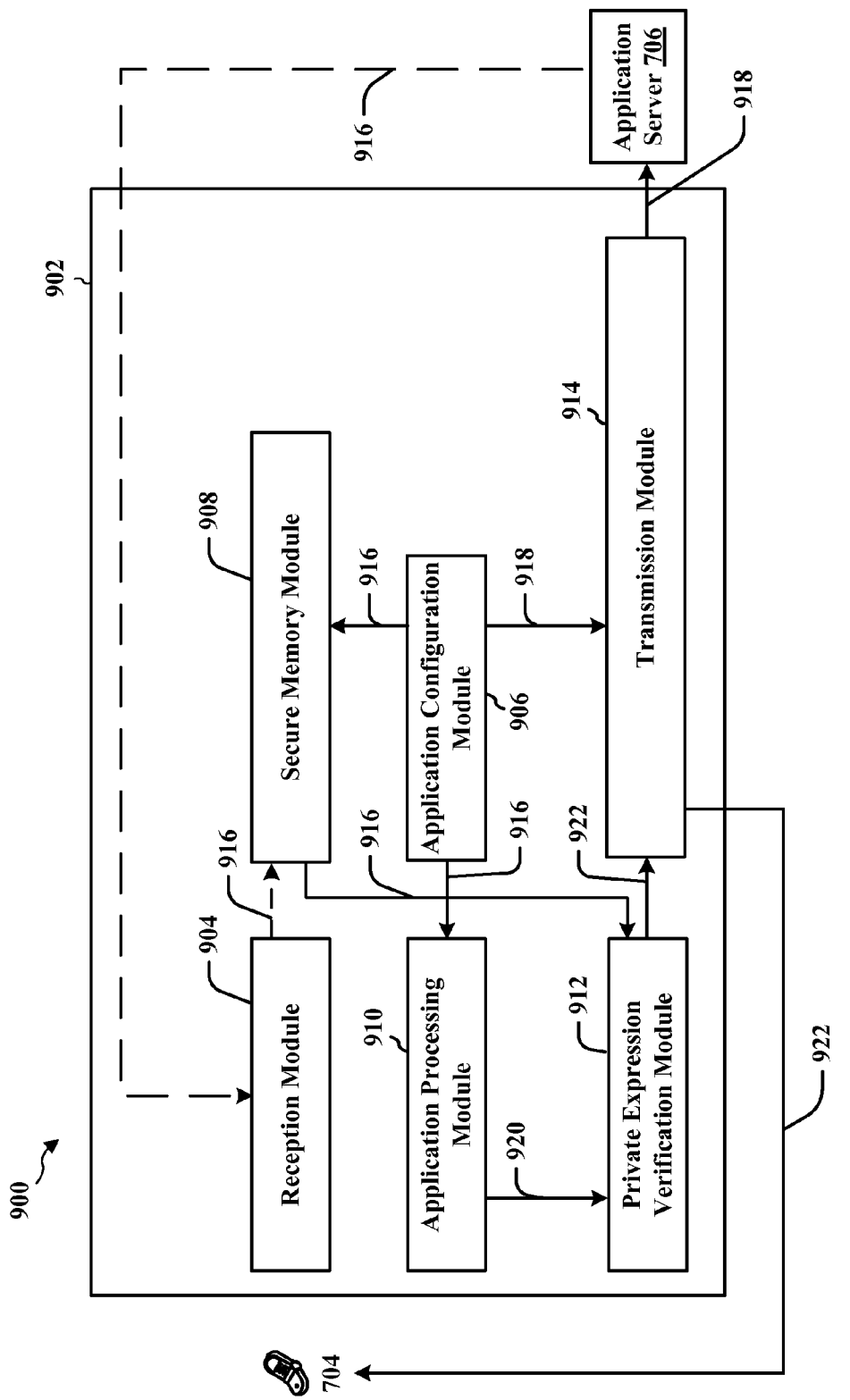
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a UE.

The apparatus 902 includes an application processing module 910 that may receive a request 920 from an application to announce a private expression 922. In an aspect, the request 920 may include an expression-code 916 and/or a reference to the expression-code 916. In an aspect, the expression-code 916 may be generated by application configuration module 906 and stored in secure memory module 908. In an optional aspect, the expression-code 916 may be received from a trusted application server 706 using reception module 904. The apparatus 902 may further include private expression verification module 912 that may be configured to compare the expression-code 916 and/or a reference to the expression-code 916 received with request 920 with the expression-code 916 stored in secure memory module 908. In an aspect, private expression verification module 912 may be implemented as described with respect to expression verification manager 730. Where the expression-codes 916 match, private expression verification module 912 prompts transmission module 914 to announce the private expression 922. By contrast, where the expression-codes 916 do not match, private expression verification module 912 prohibits transmission module 914 from announcing the private expression 922. In another aspect, application configuration module 906 may generate opaque D2D information 918 associated with the expression-code for transmission using transmission module 914. In such an aspect, opaque D2D information 918 may be transmitted to another UE (e.g., UE 704) and/or a trusted application server 706. Further, in such an aspect, opaque D2D information 918 may include the private expression, the expression-code, a name of the application, a counter, a time of generation, a previously generated expression-code, an expiration date, a certificate of the announcing UE, etc. In another aspect, the opaque D2D information 918 may be signed with a digital signature indicating authenticity of the opaque D2D information.

The apparatus may include additional modules that perform each of the steps of the algorithm in the aforementioned flow charts of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
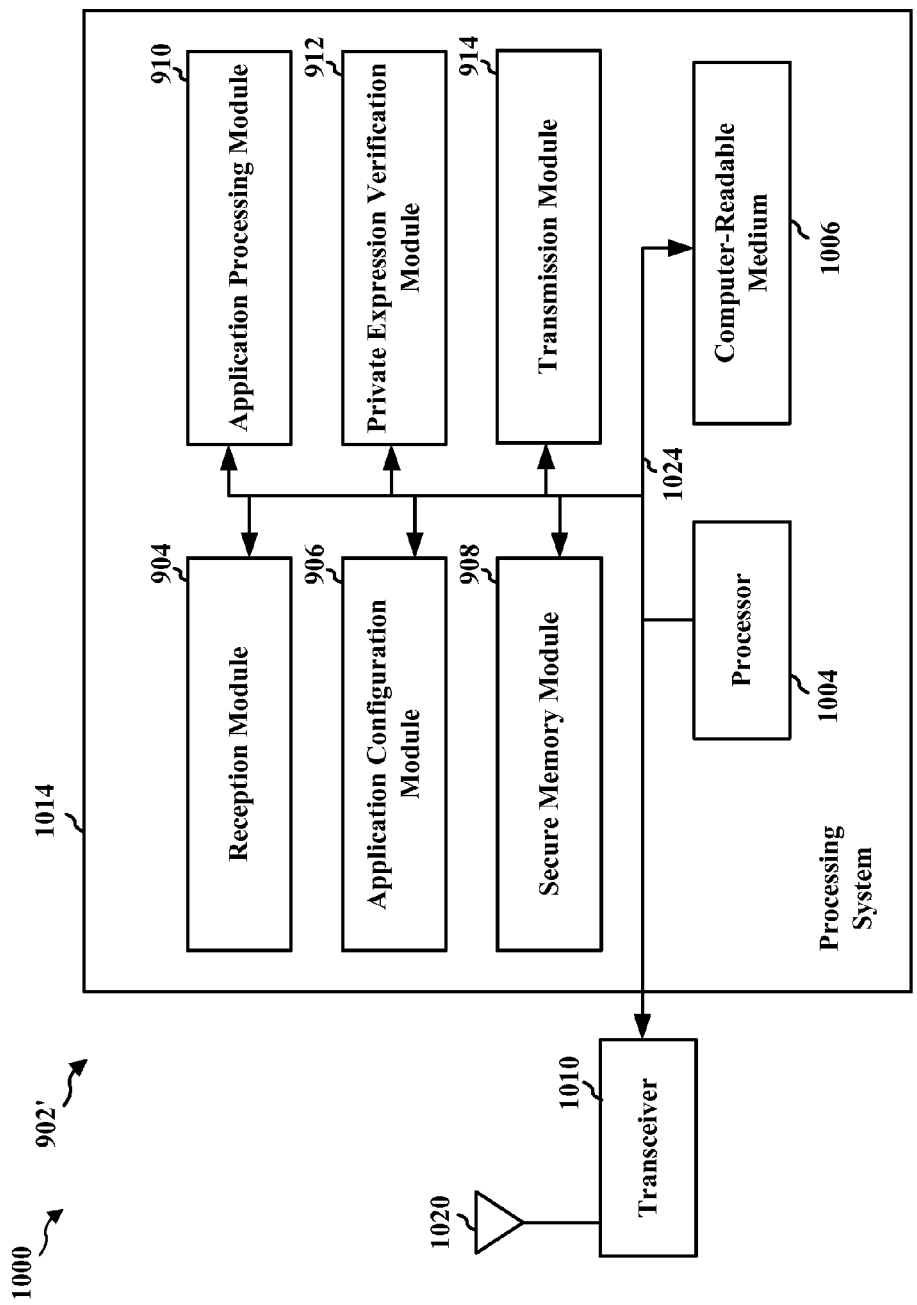
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 804, 806, 808, 810, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, and 910. The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means for receiving a request, including an expression-code associated with the private expression, to announce a private expression, means for determining, by an expression verification manager (EVM), whether the expression-code corresponds to a previously obtained and stored instance of the expression-code, means for announcing at least one of the private expression or the expression-code upon a determination that the expression-code corresponds to the stored instance of the expression-code, and/or means for prohibiting announcement of information associated with the private expression upon a determination that the expression-code does not correspond to the stored instance of the expression-code. In another aspect, the apparatus 902/902' means for obtaining the instance of the expression-code as part of a configuration process for the application. In such an aspect, the apparatus 902/902' may include means for storing the instance of the expression-code in a secure memory store. In another aspect, the apparatus 902/902' may include means for transmitting opaque D2D information associated with the expression-code. In another aspect, the apparatus 902/902' means for generating may be further configured to generate a digital signature indicating authenticity of the opaque D2D information, and wherein the opaque D2D information is transmitted with the generated digital signature. In an aspect, the apparatus 902/902' may include means for obtaining the instance of the expression-code securely from a trusted server. In such an aspect, the apparatus 902/902' may include means for storing the instance of the expression-code in a secure memory store. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" and/or "one or more of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications of a user equipment (UE), comprising:
   generating, by an expression verification manager (EVM) of the UE, an instance of an expression-code as part of a configuration process for an application to be executed by a processor of the UE, wherein the EVM is associated with a modem of the UE;
   storing the instance of the expression-code in a secure memory store;
   receiving, at the processor of the UE, a request from the application to announce a private expression over a device-to-device communication channel, wherein the request includes at least a reference to an expression-code associated with the private expression and the application;
   determining, by the EVM, whether the at least the reference to the expression-code corresponds to the previously generated and stored instance of the expression-code associated with the application;
   announcing, using long term evolution (LTE) based wireless wide area network (WWAN) spectrum or unlicensed spectrum, the expression-code associated with the private expression and the application over the device-to-device communication channel to one or more other authorized peer devices upon a determination that the at least the reference to the expression-code corresponds to the stored instance of the expression-code; and
   prohibiting announcement of information associated with the private expression upon a determination that the at least the reference to the expression-code does not correspond to the stored instance of the expression-code.

2. The method of claim 1, wherein the secure memory store is a non-volatile memory (NVM) associated with a user equipment (UE).

3. The method of claim 1, further comprising:
   transmitting opaque device to device (D2D) information associated with the expression-code.

4. The method of claim 3, wherein the opaque D2D information is transmitted securely to one or more authorized devices.

5. The method of claim 3, wherein the opaque D2D information is transmitted to an application server associated with the application.

6. The method of claim 3, wherein the opaque D2D information includes at least one of:
   the private expression, the expression-code, a name of the application, a counter, a time of generation, a previously generated expression-code, an expiration date, or a certificate of an announcing user equipment (UE).

7. The method of claim 3, further comprising:
   generating a digital signature indicating authenticity of the opaque D2D information, and wherein the opaque D2D information is transmitted with the generated digital signature.

8. The method of claim 7, wherein the digital signature may also include at least one of:
   an operator signed key, a temporary device identifier, or a time to live (TTL) value.

9. The method of claim 1, wherein obtaining the instance of the expression code comprises:
   obtaining the instance of the expression-code securely from a trusted server.

10. The method of claim 1, wherein the EVM is configured as an intermediary layer between an application interface and a modem interface of the UE.

11. The method of claim 10, wherein a first portion of the EVM is associated with the modem of the UE, and wherein a second portion of the EVM is configured as the intermediary layer between the application interface and the modem interface of the UE.

12. A user equipment (UE) for wireless communication, comprising:
   means for generating, by an expression verification manager (EVM) of the UE, an instance of an expression-code as part of a configuration process for an application to be executed by a processor of the UE, wherein the EVM is associated with a modem of the UE;
   means for storing the instance of the expression-code in a secure memory store;

means for receiving, at the processor of the UE, a request from the application to announce a private expression over a device-to-device communication channel, wherein the request includes at least a reference to an expression-code associated with the private expression;
means for determining, by the EVM, whether the at least the reference to the expression-code corresponds to a previously generated and stored instance of the expression-code associated with the application;
means for announcing, using long term evolution (LTE) based wireless wide area network (WWAN) spectrum or unlicensed spectrum, the expression-code associated with the private expression and the application over the device-to-device communication channel to one or more other authorized peer devices upon a determination that the at least the reference to the expression-code corresponds to the stored instance of the expression-code; and
means for prohibiting announcement of information associated with the private expression upon a determination that the at least the reference to the expression-code does not correspond to the stored instance of the expression-code.

13. The UE of claim 12, wherein the secure memory store is a non-volatile memory (NVM) associated with the UE.

14. The UE of claim 12, wherein the means for announcing is configured to:
transmit opaque device to device (D2D) information associated with the expression-code.

15. The UE of claim 14, wherein the opaque D2D information is transmitted securely to one or more authorized devices.

16. The UE of claim 14, wherein the opaque D2D information is transmitted to an application server associated with the application that distributes private expression-codes to applications on the one or more other authorized peer devices.

17. The UE of claim 14, wherein the opaque D2D information includes at least one of:
the private expression, the expression-code, a name of the application, a counter, a time of generation, a previously generated expression-code, an expiration date, or a certificate of an announcing UE.

18. The UE of claim 14, wherein the means for determining are further configured to:
generate a digital signature indicating authenticity of the opaque D2D information, and wherein the opaque D2D information is transmitted with the generated digital signature.

19. The UE of claim 18, wherein the digital signature may also include at least one of:
an operator signed key, a temporary device identifier, or a time to live (TTL) value.

20. The UE of claim 12, wherein the means for obtaining the instance of the expression-code are configured to obtain the instance of the expression-code securely from a trusted server.

21. The UE of claim 12, wherein the EVM is configured as an intermediary layer between an application interface and a modem interface of the UE.

22. The UE of claim 21, wherein a first portion of the EVM is associated with the modem of the UE, and wherein a second portion of the EVM is configured as the intermediary layer between the application interface and the modem interface of the UE.

23. A user equipment (UE) for wireless communication, comprising:
a memory; and
at least one processor coupled to the memory and configured to:
generate, by an expression verification manager (EVM) of the UE, an instance of an expression-code as part of a configuration process for an application to be executed by the at least one processor of the UE, wherein the EVM is associated with a modem of the UE;
store the instance of the expression-code in a secure memory store;
receive, at the at least one processor of the UE, a request from an application to announce a private expression over a device-to-device communication channel, wherein the request includes at least a reference to an expression-code associated with the private expression and the application;
determine, by the EVM, whether the at least the reference to the expression-code corresponds to the previously generated and stored instance of the expression-code associated with the application;
announce, using long term evolution (LTE) based wireless wide area network (WWAN) spectrum or unlicensed spectrum, the expression-code associated with the private expression and the application over the device-to-device communication channel to one or more other authorized peer devices upon a determination that the at least the reference to the expression-code corresponds to the stored instance of the expression-code; and
prohibit announcement of information associated with the private expression upon a determination that the at least the reference to the expression-code does not correspond to the stored instance of the expression-code.

24. The UE of claim 23, wherein the secure memory store is a non-volatile memory (NVM) associated with the UE.

25. The UE of claim 23, wherein the at least one processor is further configured to:
transmit opaque device to device (D2D) information associated with the expression-code.

26. The UE of claim 25, wherein the opaque D2D information is transmitted securely to one or more authorized devices.

27. The UE of claim 25, wherein the opaque D2D information is transmitted to an application server associated with the application.

28. The UE of claim 25, wherein the opaque D2D information includes at least one of:
the private expression, the expression-code, a name of the application, a counter, a time of generation, a previously generated expression-code, an expiration date, or a certificate of an announcing UE.

29. The UE of claim 25, wherein the at least one processor is further configured to:
generate a digital signature indicating authenticity of the opaque D2D information, and wherein the opaque D2D information is transmitted with the generated digital signature.

30. The UE of claim 29, wherein the digital signature includes at least one of:
an operator signed key, a temporary device identifier, or a time to live (TTL) value.

31. The UE of claim 23, wherein the at least one processor is further configured to:
obtain the instance of the expression-code securely from a trusted server.

32. The UE of claim 23, wherein the EVM is configured as an intermediary layer between an application interface and a modem interface of the UE.

33. The UE of claim 32, wherein a first portion of the EVM is associated with the modem of the UE, and wherein a second portion of the EVM is configured as the intermediary layer between the application interface and the modem interface of the UE.

34. A non-transitory computer-readable medium storing computer executable code for wireless communication, comprising code for:
generating, by an expression verification manager (EVM) of a user equipment (UE), an instance of an expression-code as part of a configuration process for an application to be executed by a processor of the UE, wherein the EVM is associated with a LTE based WWAN modem of the UE;
storing the instance of the expression-code in a secure memory store
receiving, at the processor of the UE, a request from the application to announce a private expression over a device-to-device communication channel, wherein the request includes at least a reference to an expression-code associated with the private expression and the application;
determining, by the EVM, whether the at least the reference to the expression-code corresponds to a previously generated and stored instance of the expression-code;
announcing, using long term evolution (LTE) based wireless wide area network (WWAN) spectrum or unlicensed spectrum, the expression-code associated with the private expression and the application over the device-to-device communication channel to one or more other authorized peer devices upon a determination that the at least the reference to the expression-code corresponds to the stored instance of the expression-code; and
prohibiting announcement of information associated with the private expression upon a determination that the at least the reference to the expression-code does not correspond to the stored instance of the expression-code.

35. The non-transitory computer-readable medium of claim 34, wherein the secure memory store is a non-volatile memory (NVM) associated with the UE.

36. The non-transitory computer-readable medium of claim 34, further comprising code for:
transmitting opaque device to device (D2D) information associated with the expression-code.

37. The non-transitory computer-readable medium of claim 36, wherein the opaque D2D information is transmitted securely to one or more authorized devices.

38. The non-transitory computer-readable medium of claim 36, wherein the opaque D2D information is transmitted to an application server associated with the application.

39. The non-transitory computer-readable medium of claim 36, wherein the opaque D2D information includes at least one of:
the private expression, the expression-code, a name of the application, a counter, a time of generation, a previously generated expression-code, an expiration date, or a certificate of an announcing user equipment (UE).

40. The non-transitory computer-readable medium of claim 36, further comprising code for:
generating a digital signature indicating authenticity of the opaque D2D information, and wherein the opaque D2D information is transmitted with the generated digital signature.

41. The non-transitory computer-readable medium of claim 40, wherein the digital signature may also include at least one of:
an operator signed key, a temporary device identifier, or a time to live (TTL) value.

42. The non-transitory computer-readable medium of claim 34, wherein the code for obtaining the instance of the expression-code includes code for securely obtaining the instance of the expression-code from a trusted server.

43. The non-transitory computer-readable medium of claim 34, wherein the EVM is configured as an intermediary layer between an application interface and a modem interface of the UE.

44. The non-transitory computer-readable medium of claim 43, wherein a first portion of the EVM is associated with the modem of the UE, and wherein a second portion of the EVM is configured as the intermediary layer between the application interface and the modem interface of the UE.

* * * * *